Dec. 5, 1950
D. B. HATCHER
2,532,493
PRODUCTION OF SILANES
Filed July 8, 1949
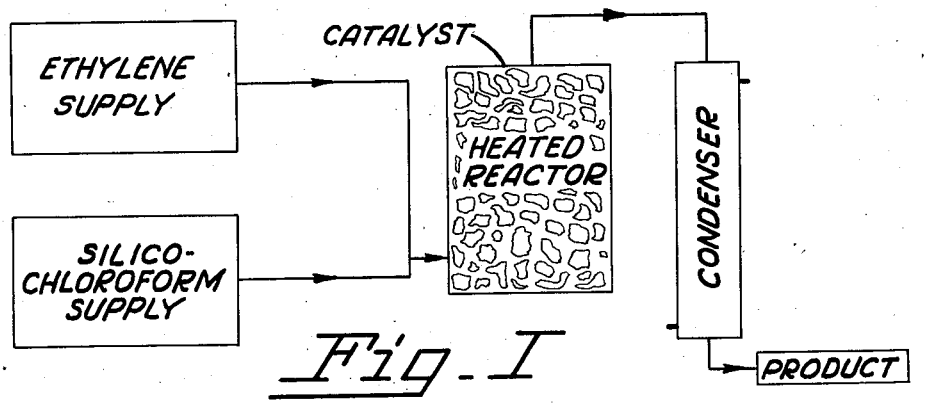
Fig. I
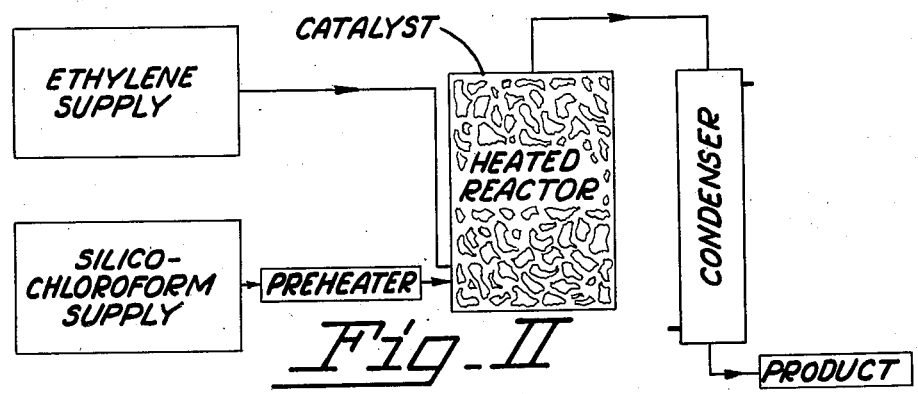
Fig. II
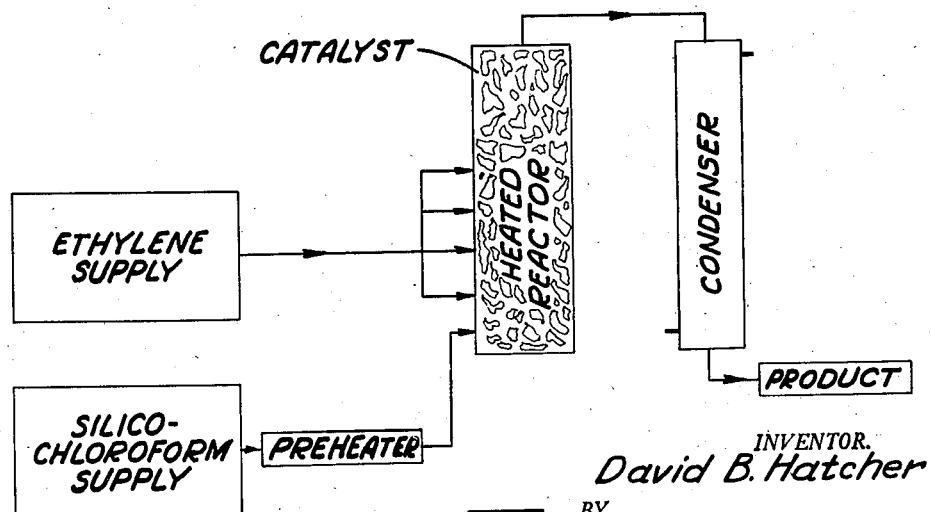
Fig. III
INVENTOR.
David B. Hatcher
BY
Marshall, Marshall & Leonard
ATTORNEYS Patented Dec. 5, 1950

2,532,493

UNITED STATES PATENT OFFICE 2,532,493

PRODUCTION OF SILANES

David B. Hatcher, Toledo, Ohio, assignor to Libbey-Owens-Ford Glass Company, Toledo, Ohio, a corporation of Ohio Application July 8, 1949, Serial No. 103,668

2 Claims. (Cl. 260—448.2)

The invention relates to the production of silanes by the reaction of ethylene with silicochloroform.

Silanes, which are simple organosilicon compounds, have been made available as cheap raw materials by the discovery of inexpensive methods of manufacturing them. One of the least expensive methods of manufacturing silanes consists in the reaction of ethylene with silicochloroform. Under ordinary conditions the reaction of ethylene with silicochloroform produces only alkyltrichlorosilanes. The use of an aluminum trihalide catalyst makes it possible to obtain diethyldichlorosilane from the reaction of ethylene with silicochloroform.

Diethyldichlorosilane, which can be thus inexpensively produced from ethylene and silicochloroform, is an important raw material because it is necessary in many cases to employ a compound containing more than one alkyl radical per silicon atom.

In order to be carried out inexpensively, the reaction of ethylene with silicochloroform must be conducted as a continuous process in which the reactants are introduced into a reaction zone and the reaction products are drawn off. The use of an aluminum trihalide catalyst, which has been necessary heretofore in order to obtain diethyldichlorosilane economically from the reaction of ethylene with silicochloroform, entails serious difficulties in that such a catalyst is a vapor at the reaction temperature and therefore cannot be retained in the reaction zone. The aluminum trihalide catalyst leaves the reaction zone with the reaction products and must be separated from the reaction products. In addition, the aluminum trihalide catalyst must be introduced continually into the reaction zone along with the ethylene and silicocholoroform. The necessity for continually introducing an aluminum trihalide catalyst into the reaction zone and continually separating the catalyst from the reaction products adds materially to the cost of producing diethyldichlorosilane. Moreover, the aluminum trihalide catalyst solidifies as the reaction products begin to cool, so that such a catalyst causes serious difficulties by plugging up the passages through which the reaction products are conducted.

The principal object of the invention is to provide a novel method of reacting ethylene with silicochloroform in which a novel catalyst is employed that remains in the reaction zone and does not leave the reaction zone with the reaction products. More specific objects and advantages are apparent from the description, in which reference is had to the accompanying drawings illustrating preferred embodiments of the invention.

Figure 1 of the drawings is a diagram illustrating a method of practicing the invention.

Figure 2 is a diagram illustrating another method of practicing the invention.

Figure 3 is a diagram illustrating a preferred method of practicing the invention.

These specific drawings and the specific description that follows merely disclose and illustrate and are not intended to limit the scope of the invention.

It has been found that in many cases a complex of aluminum chloride with a chloride of another metal is inert and does not act as a catalyst in the reaction of ethylene with silicochloroform. The present invention is based upon the discovery that zinc aluminum chloride is effective as a catalyst in the reaction of ethylene with silicochloroform to produce diethyldichlorosilane, and that zinc aluminum chloride does not volatilize at the reaction temperature and can be retained in the reactor.

The only products of the reaction of ethylene and silicochloroform at low temperatures are monoalkylsilanes. When a mixture of ethylene and silicochloroform is heated, some of the ethylene is lost by addition polymerization, and the remainder of the ethylene is likely to be used up by the reaction which produces monoalkylsilanes before a temperature is reached at which dialkylsilanes can be formed. Thus, in order to carry out the reaction by which a silane having more than one alkyl radical in the molecule is formed, it is necessary to get the reaction started before one of the reactants is completely used up by formation of monoalkylsilanes or by polymerization. In the practice of the present invention the temperature at which the desired reaction takes place should be attained before either of the reactants is completely used up. The catalyst permits the reaction by which dialkylsilanes are formed to take place at relatively low temperatures, thus reducing the danger that one of the reactants will be used up before the desired reaction begins, and increasing the yields of the desired products.

In the practice of the present invention the reactants may be brought to the reaction temperature before one of the reactants is used up by rapidly heating a mixture of ethylene and silicochloroform to the reaction temperature in the presence of zinc aluminum chloride in the reaction zone as shown in Figure 1. The mixture of ethylene and silicochloroform may be preheated (e. g., by passing it rapidly through a narrow heating tube) before introduction into the reaction zone.

Preferably, the reactants are brought together at the reaction temperature by heating them separately to such a temperature that when they are mixed and introduced into the reaction zone the mixture is already at the reaction temperature. A still better way of bringing the reactants together at the reaction temperature consists in preheating only the silicochloroform, and mixing it with the ethylene as the reactants are introduced into the reaction zone as shown in Figure 2.

The most desirable procedure for carrying out the present reaction consists in preheating only the silicochloroform substantially to the reaction temperature, and mixing it gradually with ethylene in the reaction zone by introducing ethylene simultaneously in small quantities at successive points along the reaction zone as shown in Figure 3.

Silanes prepared by the reaction of the invention have the general formula

in which each of the radicals R and R' is an alkyl radical, and each of the radicals A and A' is an alkyl radical or a chloro radical. The most important product of the reaction is diethyldichlorosilane. From the reaction products, in addition to the desired products just described, can be separated (e. g., by fractional distillation) silicochloroform, silicon tetrachloride and ethyltrichlorosilane. N-butyltrichlorosilane and n-hexyltrichlorosilane are sometimes recovered from the reaction products, and it is believed that further substituted compounds (for example, compounds in which R, R' and A are ethyl, or in which R is ethyl, R' is n-butyl and A and A' are chloro) are also formed during the course of the reaction. Unidentified high boiling compounds are also recovered; the hydrolyzable chlorine content of these high boiling compounds is sufficiently low that they are believed to be silane products having fewer than three chlorine atoms per silicon atom in the silane molecule. The actual formation of a silane having more than one alkyl radical in the molecule may be preceded by the formation of an intermediate such as dichlorosilane which reacts with the ethylene to give a dialkyldichlorosilane. Diethyldichlorosilane is a particularly useful product of the reaction of the invention; this is true because its molecule contains only two hydrolyzable radicals so that its hydrolysis and subsequent condensation to a siloxane result in a cyclic or straight chain polymer. Thus it is useful as a modifying agent to limit cross-linking in the preparation of siloxane condensation products.

An aluminum trihalide, i. e., anhydrous aluminum chloride or anhydrous aluminum bromide, has been used heretofore as the catalyst. However, such a substance is a vapor at the reaction temperature, and although useful when the reaction is conducted as a batch process cannot be employed as efficiently as the zinc aluminum chloride used in the present method. When the reaction is conducted as a continuous process, which is, of course, by far the more useful method, anhydrous aluminum chloride or anhydrous aluminum bromide can be used only with great difficulty and expense.

The zinc aluminum chloride catalyst used in the present invention is a complex having the formula $Al_2Cl_6 \cdot 1.5ZnCl_2$ and is prepared by heating to fusion aluminum chloride ($AlCl_3$) and zinc chloride ($ZnCl_2$) in a molar ration of 2:1.5. The reactor may be initially filled one-half to three-quarters full with solid lumps of the complex, which are melted at the reaction temperature so that the ethylene and silicochloroform are bubbled through the catalyst during the reaction. It is preferable to use porous clay Raschig rings or pieces of porous porcelain impregnated with the catalyst. For example, the complex can be heated to a pasty condition (at 150–160 degrees C.) and then poured into the reactor containing the Raschig rings or pieces of porous porcelain for absorbing the catalyst.

The reaction zone in the present invention may comprise a vertical, stationary reactor which is heated by any method ordinarily employed (e. g., by electrically heated coils, a molten salt bath or by flue gases). The reaction is conducted as a continuous operation by passing the reactants into the reactor, allowing the reaction to proceed to substantial completion, cooling the products by means of a condenser connected to the reactor, and separating the products by fractional distillation. It is desirable in all instances to avoid the introduction of air, containing mosture, which hydrolyzes the silanes present in the reactor to produce hydrogen chloride.

When the method of the invention is carried out by introducing a mixture of ethylene and silicochloroform into a heated reactor containing zinc aluminum chloride as shown in Figure 1, it is desirable to heat the mixture as rapidly as possible to a temperature at which the desired dialkylsilanes are formed. Although the presence of a catalyst such as zinc aluminum chloride or an aluminum trihalide permits the desired reaction to take place at lower temperatures, its presence also catalyzes the polymerization of ethylene. Elevated temperatures also increase the rate of polymerization of ethylene. However, higher temperatures apparently accelerate the desired reaction between ethylene and silicochloroform more than they accelerate the polymerization of ethylene. Therefore, in order to obtain good yields of the desired products the mixture of reactants must be heated so rapidly to a temperature at which the desired reaction takes place that there is a minimum of time in the reactor during which the reactants are within the temperature range in which monoalkylsilanes are formed and ethylene polymerizes. Thus, the mixture of ethylene and silicochloroform preferably should reach the desired reaction temperature within a minute after coming into contact with the catalyst in the reactor, although the use of the maximum amount of catalyst hereinafter specified permits diethyldichlorosilane to be obtained even when the mixture takes as long as four hours to reach the reaction temperature after coming in contact with the catalyst. Ordinarily, it is preferable that the mixture reach the desired reaction temperature within about thirty seconds and most desirable that it reach this temperature within about 15 seconds after coming into contact with the catalyst in the reactor.

In order that the mixture of reactants may attain the reaction temperature almost instantaneously after coming into contact with the catalyst in the reactor, it may be preheated as rapidly as possible to substantially the desired reaction temperature before introduction into the reactor. However, during such preheating without the catalyst both polymerization of ethylene and formation of monoalkylsilanes occur, and the yield of dialkylsilanes is thus decreased. (The word "yield" is used herein to mean per cent conversion of the silicochloroform charged to the desired product.) If the reactants are preheated before introduction into the reactor, it is preferable to preheat them separately to such a temperature that when they are mixed and introduced into the reactor they will be at a temperature at which the desired reaction will take place. (The attainment of the reaction temperature when the ethylene and silicochloroform are brought together may be due not only to the sensible heat provided by the preheating of the reactants, but also to heat generated by the reaction of the ethylene and silicochloroform.) Preheating the reactants separately before mixing will reduce the formation of monoalkylsilanes although some ethylene will still be used up by polymerization. In either procedure by which the mixture of reactants reaches the desired reaction temperature before entering the reactor it is desirable that the mixture come into contact with the catalyst in the reactor as soon as it has reached the minimum reaction temperature, since in the interval between preheating and coming into contact with the catalyst both polymerization of ethylene and formation of monoalkylsilanes occur.

The reaction temperatures and pressures, the reaction time and the proportions of reactants used in the present process are the same as those used with an aluminum trihalide catalyst. It is usually desirable that the reaction temperature be at least about 320 degrees C. because the desired reaction apparently is favored above this temperature when the catalyst is present with the reactants. It is usually preferable to heat the mixture of reactants to at least about 340 degrees C. and most desirably the minimum temperature is about 360 degrees C. Ordinarily there is no reason for heating the reaction mixture to a temperature higher than about 450 degrees C. Although heating above this temperature has no apparent undesirable effect on the products there is no advantage in conducting the reaction above this temperature. Since heating to a higher temperature wastes heat energy and causes undue equipment deterioration, 450 degrees C. is selected as the maximum practical reaction temperature. Usually it is preferable that the reaction temperature be no higher than about 400 degrees C. and the most desirable maximum temperature is about 375 degrees C.

Ordinarily the reaction time should be at least five minutes. ("Reaction time" is used herein to mean the average time required for a volume of reactants (calculated at the reaction temperature and pressure) equal to the volume of the reaction zone, to pass into the reactor.) Usually it is desirable that the reaction time be not shorter than ten minutes. There is no practical reason for using a reaction time of more than about ninety minutes since a longer reaction time ordinarily will not result in increased yields of the desired products, and it is preferable to use a reaction time not longer than about sixty minutes.

As hereinbefore stated it is believed that competing reactions, i. e., the formation of poly-(alkyl-substituted) silanes and the addition polymerization of ethylene, take place simultaneously, each reaction tending to deplete the supply of ethylene in the reactor. Therefore, it is usually desirable to use at least 0.1 mol of ethylene per mol of silicochloroform. It is usually not desirable to use more than about 3 mols of ethylene per mol of silicochloroform, as the use of a larger proportion of ethylene results in undue polymerization and consequent waste of ethylene. It is usually preferable to use from about 0.5 to about 1.5 mols of ethylene per mol of silicochloroform. When an excess of silicochloroform is present, it acts as a diluent to decrease the tendency for ethylene to polymerize. Therefore, if the unreacted silicochloroform is recovered from the reaction products and recycled, it may be desirable in some cases to use comparatively low ratios of ethylene to silicochloroform to save ethylene and to increase the over-all yield of desired products. The reactants may be mixed in the proper molar proportions before entering the reactor. The rate at which the mixture of reactants is introduced into the reaction zone depends upon the size of the reactor and the desired reaction time. The silicochloroform may be pumped as a liquid and the quantity thus controlled through the rate of pumping. The quantity of ethylene, which is a gas and is under pressure, may be controlled by feeding the ethylene through a flow meter.

Because ethylene is a gas, it is desirable to conduct the reaction at superatmospheric pressure. As hereinbefore noted, it is desirable to react ethylene with silicochloroform in molal ratios from about 0.1:1 to about 3:1, and such molal ratios can be reacted in reasonable quantities within a given time without the use of an extremely large reactor by conducting the reaction at superatmospheric pressure. It is desirable to avoid unduly high pressures, to eliminate the danger of explosive polymerization of the ethylene. It is ordinarily not practical to conduct the reaction at pressures lower than about 200 pounds per square inch gauge at reaction temperatures. It is ordinarily preferable that the pressure at reaction temperatures be at least about 400 pounds per square inch gauge and most desirable that it be at least about 600 pounds per square inch gauge. It is ordinarily not advisable to conduct the reaction at pressures higher than about 2000 pounds per square inch gauge. It is preferable to conduct the reaction at pressures not greater than about 1500 pounds per square inch gauge. It is usually most desirable to conduct the reaction at pressures not higher than about 1000 pounds per square inch gauge. Higher pressures can safely be used in the presence of a diluent such as nitrogen or excess silicochloroform. The use of nitrogen dilution is sometimes desirable, as it may result in an increased yield due to suppression of the polymerization of ethylene. The reactor may be flushed with nitrogen and filled with nitrogen under pressure before the mixture of silicochloroform and ethylene is admitted, as a precaution against the sudden explosive polymerization of large quantities of ethylene.

The present reaction may be carried out as a batch process (e. g., by introducing the reactants into a steel high pressure bomb placed in a heating jacket and containing the catalyst). The considerations that apply to such a batch process are the same as those that govern the operating temperature ranges, rates of heating, proportions of reactants and pressure in a continuous operation.

Although it is possible to produce diethyldichlorosilane by the reaction of ethylene and silicochloroform without any catalyst, by introducing a mixture of ethylene and silicochloroform into a heated reactor, it is not very practical to carry out the reaction without a catalyst because the resulting yields are very low, and because temperatures of approximately 450 degrees C. or higher must be used. (It may be possible to carry out the reaction at lower temperatures by subjecting the silicochloroform to prolonged heating at such temperatures before the ethylene is mixed with the silicochloroform.) Moreover, without the use of a catalyst it is necessary to heat the mixture of reactants in the reactor to a temperature within the range of about 450 to 600 degrees C. in a period of time as short as the period of time during which it is necessary to heat the reactants to a much lower temperature (i. e., approximately 320 degrees C.) when the catalyst is present. The high temperatures that must be employed without the use of a catalyst involve greater expense not only in that more heat energy must be supplied, but also in that greater deterioration of equipment results from the use of such high temperatures at the high pressures employed.

Aluminum trihalides, which were used heretofore as catalysts in such a reaction, made it necessary to conduct the reaction between ethylene and silicochloroform as a continuous process by a procedure considerably more complex than the procedure hereinbefore described in which zinc aluminum chloride is used as the catalyst. A catalyst such as anhydrous aluminum chloride or anhydrous aluminum bromide exists in the vapor phase under the temperature-partial pressure conditions which prevail in the reaction zone during the course of the reaction. It is necessary to provide some means for introducing such a catalyst continuously into the reaction zone because the catalyst continuously leaves the reaction zone with the reaction products. Also, the continuous run must be halted frequently to clean the passages through which the reaction products are conducted, since the aluminum trihalide catalyst solidifies as the products begin to cool and plugs up the passages. The aluminum trihalide which does not solidify in the passages remains dissolved in the product and can be separated only with difficulty. The advantages of using zinc aluminum chloride, which can be initially present in the reactor and which is retained in the reactor throughout the process, are readily apparent.

The zinc aluminum chloride catalyst may be used in the reactor in the same amounts as an aluminum trihalide catalyst. The catalyst ordinarily should be present in the reaction mixture in an amount not less than about 6 per cent. ("Per cent of catalyst" is used to refer to per cent by weight of catalyst based on the amount of silicochloroform present in the reactor.) It is usually preferable to conduct the reaction in the presence of at least about 7 per cent of the catalyst, and it is most desirable to conduct the reaction in the presence of about 8 per cent of the catalyst. Ordinarily there is no reason for conducting the reaction in the presence of more than about 20 per cent of the catalyst, and it is preferable to conduct the reaction in the presence of not more than about 15 per cent of the catalyst. The most desirable maximum amount of catalyst is about 10 per cent. The time of contact between reactants and catalyst at reaction temperatures that results in substantial completion of the reaction is different for different amounts of catalyst. The amount of the catalyst may be reduced by bringing the reactants together at a temperature higher than 320° C.

When the present reaction is carried out, as hereinbefore described, by introducing a mixture of ethylene and silicochloroform into a heated reactor, the mixture should be brought to the reaction temperature as soon as possible after coming into contact with the zinc aluminum chloride catalyst in the reactor, in order to minimize polymerization of the ethylene. Thus, the heat input must be great enough to bring the mixture of cold reactants to the desired reaction temperature.

A better procedure consists in preheating the silicochloroform only, and mixing it with the ethylene as these reactants enter the reactor containing the zinc aluminum chloride catalyst, as shown in Figure 2. In such a procedure the reactants are at essentially the desired reaction temperature as soon as they come into contact with the catalyst, thus minimizing the formation of monoalkylsilanes and the polymerization of ethylene. The reaction is exothermic and the heat input to the reactor need be only sufficient to maintain the desired reaction temperature.

When the present reaction is conducted by this procedure, the reactor is filled with zinc aluminum chloride catalyst as described hereinbefore. The liquid silicochloroform is vaporized and preheated before introduction into the reactor, the quantity being regulated by the rate of pumping. The temperature of the silicochloroform should be high enough so that when it is mixed with the cold ethylene the mixture is at approximately the desired reaction temperature, i. e., between 320 degrees C. and 450 degrees C. and preferably between 360 degrees C. and 400 degrees C. The rate at which the silicochloroform is introduced into the reaction zone depends upon the size of the reactor, the rate of ethylene addition and the desired reaction time. The reaction time and the pressure may be as hereinbefore described.

The amount of ethylene that is added directly to the reactor (controlled by feeding the ethylene from a cylinder through a flow meter) may be as little as 0.1 mol per mol of silicochloroform or as high as 2 mols per mol of silicochloroform, but preferably is from 0.5 to 1.3 mols per mol of silicochloroform. It is believed that the reaction of the invention proceeds in the molal ratio of 1:1 when diethyldichlorosilane is the product, i. e., that two molecules of ethylene and two molecules of silicochloroform are consumed to form one molecule of diethyldichlorosilane; however, because some of the ethylene undergoes addition polymerization during the course of the reaction it is usually advisable to add a slight excess of ethylene over that theoretically required to react with all the silicochloroform. There is no advantage in using an excess of ethylene over that actually required to react with all the silicochloroform in the reactor, but if the silicochloroform is recovered and recycled it may be economically advantageous to add slightly less ethylene than is required to react with all the silicochloroform, to minimize polymerization of the ethylene. It is desirable that the ethylene added to the reactor be mixed rapidly with the silicochloroform as these reactants are introduced into the reactor to avoid local high concentrations of ethylene and consequent excessive polymerization.

The reaction may be conducted as a batch process using the method of mixing ethylene with preheated silicochloroform in a reactor containing the catalyst, the same general considerations governing the course of the reaction as when it is conducted as a continuous operation as hereinbefore described, except that a somewhat larger ratio of ethylene to silicochloroform may be used, e. g., as high as 3 mols of ethylene per mol of silicochloroform may be added at a very slow uniform rate to the heated silicochloroform in the reactor.

The volatility of the anhydrous aluminum chloride or anhydrous aluminum bromide heretofore used as a catalyst made it necessary to introduce catalyst continually into the reactor to replace that removed with the reactants. Usually such a catalyst, in the form of vapor or in the form of a mixture of the vapor with nitrogen, was mixed with the silicochloroform entering a continuous reactor. Thus the procedure for conducting the reaction by a continuous operation was more complex than that employed with a zinc aluminum chloride catalyst in the present method as hereinbefore described.

Heretofore when a volatile catalyst was mixed with the silicochloroform (e. g., in a vaporizer) before introduction (along with the ethylene) into the reactor, not only was the process more time-consuming and more expensive than a process embodying the present invention (conducted under the same conditions) in which the vaporized silicochloroform comes in contact with zinc aluminum chloride in the reactor, but also the yield of dialkylsilanes was less. The greater yield obtained in the present process may be explained either on the ground that zinc aluminum chloride is a more effective catalyst than an aluminum trihalide, or on the ground that better contact with the catalyst is obtained using a catalyst that remains in the reactor. That is, as much zinc aluminum chloride catalyst as desired can be placed in the continuous reactor, whereas the amount of an aluminum trihalide catalyst in the reactor at any one time is limited to the amount of vapor that can be carried by the silicochloroform.

It is believed that ethylene and silicochloroform undergo slowly, at comparatively low temperatures, the reaction which produces poly-(alkyl-substituted) silanes. When no catalyst is used, however, the ethylene and silicochloroform must be brought together at temperatures not less than about 450 degrees C. in order to obtain an appreciable yield of dialkyldichlorosilanes. Not only must the silicochloroform be preheated to a much higher temperature when the reaction is conducted with no catalyst, but also the rate of reaction is much slower when no catalyst is present than it is in the presence of zinc aluminum chloride.

When the present reaction is conducted by the method of preheating silicochloroform and mixing it with ethylene as these reactants enter the reactor containing zinc aluminum chloride, the ethylene may be added at a comparatively slow rate so that there is slightly less ethylene present than is required to react with all the silicochloroform, the excess silicochloroform acting as a diluent to suppress ethylene polymerization. The excess silicochloroform may then be recovered and recycled. This advantage of maintaining silicochloroform in excess during the reaction may be accomplished more efficiently by the procedure illustrated in Figure 3. This most desirable procedure for conducting the present reaction consists in preheating only the silicochloroform, and mixing it gradually with ethylene by introducing the ethylene in small quantities at successive points along the reactor. That is, the reactor is constructed so that jets of ethylene may be continually introduced at intervals along about one-half the length of the reactor. The reactor should be sufficiently narrow so that a portion of silicochloroform can consume the ethylene introduced from one jet before reaching the point where the next jet of ethylene enters the reactor. This allows the reaction to proceed at extremely low ethylene concentrations, thus minimizing the addition polymerization and consequent waste of ethylene. The silicochloroform is present in excess throughout a substantial portion of the reaction time and it, as well as the ethyltrichlorosilane, diethyldichlorosilane, and silicon tetrachloride formed, acts as a diluent to decrease the tendency for the ethylene to polymerize. Thus the over-all yield of desired products is increased.

Ethylene and silicochloroform can be reacted by this method in molol ratios as low as 0.1:1, but it is usually preferable to use a molol ratio of ethylene to silicochloroform between about 0.5:1 and about 1.5:1. It is practical to use a molal ratio of ethylene to silicochloroform as high as 3:1. It is desirable that the reactor be constructed so that the ethylene addition from each jet is made at a comparatively low rate, e. g., about 0.05 mol of ethylene per mol of silicochloroform, although satisfactory results are obtained by adding ethylene at a rate of about 0.5 mol per mol of silicochloroform.

The temperature of the silicochloroform as it enters the reactor should be approximately the reaction temperature, i. e., between 320 degrees C. and 450 degrees C. and preferably between 360 degrees C. and 400 degrees C. It is practical to conduct the reaction at pressures between about 200 pounds per square inch gauge and about 2000 pounds per square inch gauge, but it is usually preferable to conduct the reaction at pressures between about 600 and about 1000 pounds per square inch gauge.

The present reaction may be conducted as a batch process using the method of intermittent addition of ethylene to preheated silicochloroform and the catalyst in the reactor, the same general considerations governing the course of the reaction as when it is conducted as a continuous operation by adding ethylene simultaneously at successive points along the reactor. When a portion of ethylene is introduced into the reactor, the pressure rises sharply. When the pressure once more drops another portion of ethylene is added. This procedure is repeated until the ethylene addition is not followed by a marked drop in pressure. Ordinarily, from 1.5 to 2.5 mols of ethylene are added per mol of silicochloroform in the reactor. Pressure is not a critical variable when the reaction is conducted in this way, but it is usually preferable to add ethylene to the catalyst-silicochloroform mixture until the pressure is at least about 750 pounds per square inch gauge, and most desirably until the pressure is about 900 pounds per square inch gauge. It is ordinarily advisable to stop the ethylene addition before the pressure increases substantially above about 1200 pounds per square inch gauge because the exothermic reaction of the invention increases the temperature of the reactor soon after the ethylene is added, with the result that after the ethylene addition is complete the total pressure inside the reactor may rise substantially. It is ordinarily preferable to stop the ethylene addition before the pressure reaches about 1100 pounds per square inch gauge, and most desirably before the pressure reaches about 1000 pounds per square inch gauge.

The following example illustrates the practice of the invention:

Example

Anhydrous zinc chloride (1.5 moles, obtained by heating zinc chloride in an evaporating dish until all water is removed and cooling to solid form) is crushed and mixed with anhydrous aluminum chloride (2 moles). The mixture of solids is heated slowly in a covered evaporating dish to approximately 180 degrees C. The pasty mass which forms is maintained at this temperature for thirty minutes. The aluminum chloride that solidifies on the cover is returned to the pasty mass. When the complex is cooled below 130 degrees C. it begins to harden appreciably.

(a) Zinc aluminum chloride (200 grams of $Al_2Cl_6 \cdot 1.5ZnCl_2$ complex prepared as described in the preceding paragraph) is put in a pasty condition by heating to 150–160 degrees C. and is poured into a reactor which is about half-filled with porous clay Raschig rings measuring about one-half inch in diameter by one-half inch in length. The reactor, which is a vertical tube approximately twenty inches in length having an internal diameter of about five inches, is connected to a condenser and receiver. The length of the reactor is surrounded by electrically heated coils, covered with asbestos packing, which maintain the temperature in the reactor within the range 330–340 degrees C. Before silicochloroform enters the reactor through an opening in the bottom, it is vaporized and preheated to approximately 330 degrees C. by pumping it through the heated coils surrounding the reactor. A total amount of 1250 grams of silicochloroform is pumped into the reactor during the run. Ethylene is introduced directly into the reactor through another opening at the bottom of the tube, the rate of addition being controlled by means of a flow meter so that ethylene and silicochloroform enter the reactor in a molar ratio of 2.1:1. The "reaction time" (as hereinbefore defined) is thirty-six minutes. The pressure inside the reactor during the run is about 600 to 700 pounds per square inch gauge. The products formed are cooled in the condenser. The condensate is fractionally distilled through a jacketed column four feet in length packed with glass helices. The product recovered includes silicochloroform (323 grams), ethyltrichlorosilane (172.8 grams) and diethyldichlorosilane (108 grams).

(b) Ethylene and silicochloroform are reacted by the procedure described in (a) (using the catalyst left in the reactor from that run), except that they are introduced into the reactor in a molar ratio of 2.2:1, a total amount of 2250 grams of silicochloroform is pumped into the reactor during the run, and the reaction time is thirty-eight minutes. The product recovered after fractional distillation includes silicochloroform (476 grams), ethyltrichlorosilane (728 grams) and diethyldichlorosilane (280 grams).

(c) The reactor is cleaned out, and ethylene and silicochloroform are reacted by the procedure described in (a) using fresh catalyst (350 grams of the zinc aluminum chloride complex, prepared and poured into the reactor as described in (a)). The ethylene and silicochloroform are introduced into the reactor in a molar ratio of 2.2:1, and a total amount of 2500 grams of silicochloroform is pumped into the reactor during the run. The reaction time is thirty minutes. The product recovered after fractional distillation includes silicochloroform (804 grams), ethyltrichlorosilane (918 grams) and diethyldichlorosilane (306 grams).

Having described the invention, I claim:

1. A method of producing silanes that comprises reacting ethylene with silicochloroform in the presence of zinc aluminum chloride at temperatures from 320° C. to 450° C. and at pressures from 200 to 2000 pounds per square inch gauge.

2. A method of reacting ethylene and silicochloroform that comprises introducing ethylene and silicochloroform into a reaction zone that is at temperatures from 320° C. to 450° C. and at pressures from 200 to 2000 pounds per square inch gauge, containing zinc aluminum chloride, and removing the reaction products from the reaction zone in gaseous form.

DAVID B. HATCHER.

REFERENCES CITED

The following references are of record in the file of this patent:

UNITED STATES PATENTS

| Number | Name | Date |
|---|---|---|
| 2,379,821 | Miller | July 3, 1945 |
| 2,407,181 | Scott | Sept. 3, 1946 |